(12) United States Patent
Lin

(10) Patent No.: US 9,690,916 B2
(45) Date of Patent: Jun. 27, 2017

(54) MULTI-FUNCTION IDENTIFICATION SYSTEM AND OPERATION METHOD THEREOF

(71) Applicant: SunASIC Technologies, Inc., New Taipei (TW)

(72) Inventor: Chi-Chou Lin, New Taipei (TW)

(73) Assignee: Sunasic Technologies Inc., New Taipei (TW)

( * ) Notice: Subject to any disclaimer, the term of this patent is extended or adjusted under 35 U.S.C. 154(b) by 398 days.

(21) Appl. No.: 14/071,760

(22) Filed: Nov. 5, 2013

(65) Prior Publication Data

US 2015/0127951 A1 May 7, 2015

(51) Int. Cl.
*G06F 21/00* (2013.01)
*G06F 21/32* (2013.01)
*G06F 21/44* (2013.01)
*G07C 9/00* (2006.01)
*G06F 21/35* (2013.01)

(52) U.S. Cl.
CPC ............. *G06F 21/32* (2013.01); *G06F 21/44* (2013.01); *G06F 21/35* (2013.01); *G07C 2009/00984* (2013.01)

(58) Field of Classification Search
CPC .......... G06F 21/32; G06F 21/34; G06F 21/35; G06F 21/44; G06F 21/445; G07C 2009/00984; G07C 9/00071

USPC .......................................... 713/186; 382/124
See application file for complete search history.

(56) References Cited

U.S. PATENT DOCUMENTS

| | | | | |
|---|---|---|---|---|
| 5,995,630 A | * | 11/1999 | Borza | G06F 21/32 340/5.26 |
| 2006/0143441 A1 | * | 6/2006 | Giobbi | G06F 21/32 713/155 |
| 2006/0242423 A1 | * | 10/2006 | Kussmaul | G06F 21/32 713/182 |
| 2007/0001805 A1 | * | 1/2007 | Utter | B60R 25/24 340/5.72 |

* cited by examiner

*Primary Examiner* — Michael S McNally
*Assistant Examiner* — Trong Nguyen
(74) *Attorney, Agent, or Firm* — Che-Yang Chen; Law Offices of Scott Warmuth

(57) ABSTRACT

A multi-function identification system is described in the present invention. The system includes an appliance and a number of keys. Under a registration process, the system allows multiple appliances to be controlled by a single key or an appliance can be controlled by different keys. The system can also allow users to set specified actions to be conducted after identification processes are completed. That satisfies requirements of a multi-function identification. Meanwhile, the key is a plug-and play and on-the-go product. It is desired that the key is a host used for other purpose.

16 Claims, 4 Drawing Sheets

MULTI-FUNCTION IDENTIFICATION SYSTEM AND OPERATION METHOD THEREOF

FIELD OF THE INVENTION

The present invention relates to an identification system and operating the system. More particularly, the present invention relates to a multi-function identification system and operating the system, which enables an appliance to be controlled by a number of keys.

BACKGROUND OF THE INVENTION

Identification is closely related to security. Many methods for identifying a specified person to use a particular object are used to prevent that object from being missed used or stolen. The similar means can also allow an identified person to have "right" to do something. For example, in the ancient times, people used the skill to tear apart a stamped document into two or separated a specially marked stick for the purpose of identification. When two people got the torn document parts together or the connected the separated stick sections, as long as the stamp or the mark on the stick kept complete, money could be given or a dealt transaction could be done. For that era, technology moved so slow that such methods could be enough for identification. However, in now days, situation is much complex and techniques for identification and security are not sufficient.

The most obvious circumstance is that people know how to counterfeit an identified object. It is not difficult to copy a seal or duplicate a key. It challenges security of the protected thing. Furthermore, the skills of identification can be used for one object or the one used said object. For instance, anti-counterfeiting designs on banknotes can guarantee the value of the money and a signed check can allow a user to get a specified amount of money from a bank. Obviously, it takes couples of steps or ways to fulfill a multi-functioned identification. People in now days can easily get the same credit by using a cash card.

A very popular tool used for identification is biometrics. Biometrics refers to the identification of humans by their characteristics or traits, for example, fingerprint, face recognition, DNA, Palm print, hand geometry, iris recognition, retina, etc. Biometrics is used in computer science as a form of identification and access control. Therefore, a combination of advantages of conventional keys (or wildly defined as solutions for security) and biometrics becomes a trend for security. Among all the biometrics, fingerprint is most used feature for identification. It is not only people have been studying fingerprint for centuries, but there are already many electronic readers (modules) can be used for design. A good example is disclosed in U.S. Pat. No. 7,447,911. '911 provides an electronic identification key to be connected to a terminal system to execute at least one specific operation. The electronic identification key includes a housing, a standard interface connector, a chip-type fingerprint sensor, an embedded AP (Application Program) memory module and a control microprocessor. The control microprocessor automatically uploads an initializing program and a fingerprint application program to the terminal system. The fingerprint sensor reads a user's fingerprint and then scanned fingerprint data and reference fingerprint data stored in the electronic key are transformed to the terminal system for comparison. When the comparison passes, the execution of the at least one specific operation, such as the remote certification, control of terminal system function, personal record retrieve operation, data protection operation, or remote file access operation, is allowed.

As '911 disclosed, this invention does has advantage for multi-functioned identification. Meanwhile, it is a plug and play device. However, there are still several defects. First, the electronic identification key needs to upload the initializing program and the fingerprint application program to the terminal system. If the program is lost or the key is not compatible to the system, the invention can is not practicable. Second, the system is passive to the key. If two applications use the same key and programs, missed authorization based on identification will happen. An interesting example is that one can use his electronic identification key to open his neighbor's door.

Another prior are relating to application of biometrics for identification discloses in U.S. Pat. No. 7,903,846. This is about an improved electronic lock box system. Said system is provided for more secure control over the accessibility of a secure compartment in the electronic lock box, which is typically used to store a dwelling key. The new system uses biometric identification sensors to determine if the correct, authorized user is attempting to access the secure compartment of the electronic lock box. In one embodiment, the biometric identification sensor uses thermal scanning to detect a person's fingerprint pattern. This is compared to previously stored (enrollment) biometric identification information/data, and if the "live" (observed) biometric identification information/data sufficiently correlates to the stored enrollment biometric identification information/data, access will be granted.

'846 relates to a host device. Processes for identification only carry on the host side. Any user can be allowed to access the electronic lock box system only if the biometric identification sensors determine the correct and authorized user. A shortcoming of the invention is that the user can not be identified at device side. If the user can be identified at device side, more options or orders can be determined by the device.

Hence, the invention thought that a good identification system with biometric facility should process identification in both host side and device side. Preferably, the system can allow users to set specified actions to be conducted. That satisfies requirements of a multi-function identification. Meanwhile, the device is a plug-and play and on-the-go product. It is better that the device can be a host for other purpose.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a multi-function identification system includes: an appliance, including: an appliance memory unit for storing a key database which has a plurality of key entries, each key entry at least comprises a registered key identification (ID); an appliance software memory unit for installing appliance software which has an appliance ID and a secure communication protocol, wherein the appliance software matches a key ID from a key with the registered key IDs in the key entries of the key database, manages the key database, uniquely identifies the appliance by the appliance ID, and provides the secure communication protocol for exchanging data with a key; and an appliance micro control unit electrically linked to the appliance memory unit and the appliance software memory unit, for operating the appliance software, communicating with the key by transmitting data under the secure communication protocol, sending out the appliance ID, and performing an action according to a secret data from the key when the key ID matches anyone of the registered key IDs; and the key, including: a fingerprint sensor for fetching a user's fingerprint image and transferring the fingerprint image into a fingerprint data; a key memory unit for storing a fingerprint database and an appliance database, wherein the fingerprint database is used for storing a plurality of stored fingerprint data, and the appliance database has a plurality of appliance entries, each appliance entry at least comprises a registered appliance ID and the secret data; a key software memory unit for installing fingerprint processing software, wherein the fingerprint processing software is processed to match the fingerprint data with the stored fingerprint data, and encrypt the appliance database when at least one stored fingerprint data exists and decrypt the appliance database to be accessed when the fingerprint data matches anyone of the stored fingerprint data; and a key micro control unit electrically linked to the fingerprint sensor, the key memory unit and the key software memory unit, having the key ID which uniquely identifies a owner of the key and a secure communication protocol used for exchanging data with an appliance, for processing the fingerprint processing software, communicating with the appliance by transmitting data under the secure communication protocol, sending out the key ID, receiving the appliance ID, matching the appliance ID with the registered appliance IDs, and when one matched registered appliance ID is found, sending out the secret data stored with the matched registered appliance ID in the same appliance entry.

Preferably, the appliance further comprises an appliance connector, electrically linked to the appliance micro control unit, for transmitting data and delivering power.

Preferably, the appliance connector is a Universal Serial Bus (USB) connector or an external Serial Advanced Technology Attachment (E-SATA) connector.

Preferably, the appliance connector is a female type connector.

Preferably, the key further comprises a key connector, electrically linked to the key micro control unit, for electrically connecting with the appliance connector of the appliance, and transmitting data with the appliance connector when connected.

Preferably, the key connector is a USB connector or an E-SATA connector.

Preferably, the key connector is a male type connector.

In accordance with still another aspect of the present invention, a method for operating the multi-function identification system, includes the steps of: connecting the key connector with the appliance connector; fetching a fingerprint image; matching the fingerprint data transformed from the fingerprint image with the stored fingerprint data; accessing the appliance database if the fingerprint data matches with one of the stored fingerprint data; matching the appliance ID from the appliance with the registered appliance IDs; sending out the corresponding secret data from the key to the appliance if the appliance ID matches one of the registered appliance IDs; matching the key ID from the key with the registered key IDs; and performing the action based on the received secret data if the key ID matches one registered key ID.

Preferably, the appliance further comprises an appliance power source electrically linked to the appliance micro control unit, for providing power to the appliance memory unit, the appliance software memory unit, and the appliance micro control unit.

Preferably, the appliance stores the key ID in the key database and the key stores the appliance ID, and a corresponding secret data in the appliance database for the appliance and the key to be registered.

Preferably, the registered appliance ID and the secret data is further encrypted or decrypted by the fingerprint processing software for the corresponding fingerprint data.

Preferably, the appliance is a door lock, a car ignition system, a motorcycle ignition system, a personal computer, or a smart card reader.

Preferably, the action is unlocking the door lock, igniting the car ignition system, igniting the motorcycle ignition system, accessing the personal computer and enabling the smart card reader.

Preferably, the key entry further comprises another registered key ID or a registered message.

Preferably, the appliance entry further comprises another registered appliance ID or a registered message.

Preferably, the appliance further comprises an appliance transceiver, electrically linked to the appliance micro control unit, for transmitting data.

Preferably, the appliance transceiver is a Radio Frequency Identification (RFID) reader.

Preferably, the key further comprises a key transceiver, electrically linked to the key micro control unit, for transmitting data with the appliance transceiver of the appliance; and a key power source, electrically linked to the key micro control unit, for providing power to the fingerprint sensor, the key memory unit, the key software memory unit and the key micro control unit.

Preferably, the key transceiver is a RFID tag.

In accordance with still another aspect of the present invention, a method for operating the multi-function identification system includes the steps of: linking the key transceiver with the appliance transceiver; fetching a fingerprint image; matching the fingerprint data transformed from the fingerprint image with the stored fingerprint data; accessing the appliance database if the fingerprint data matches with one of the stored fingerprint data; matching the appliance ID from the appliance with the registered appliance IDs; sending out the corresponding secret data from the key to the appliance if the appliance ID matches one of the registered appliance IDs; matching the key ID from the key with the registered key IDs; and performing the action based on the received secret data if the key ID matches one registered key ID.

DETAILED DESCRIPTION OF THE PREFERRED EMBODIMENTS

The present invention is now described more specifically with reference to the following embodiments.

Figure 1:
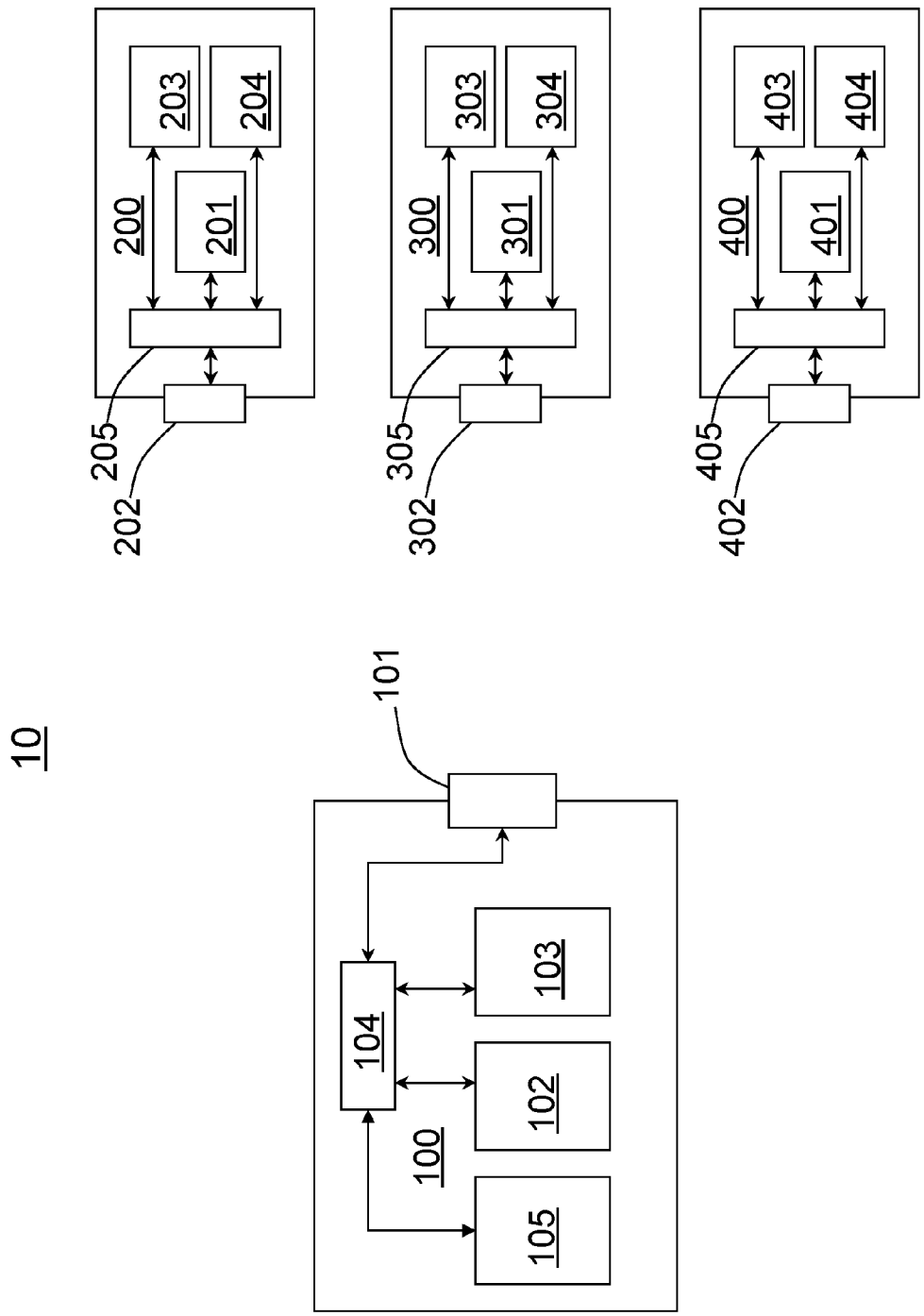
FIG. 1 is a block diagram of a first embodiment according to the present invention.
Figure 2:
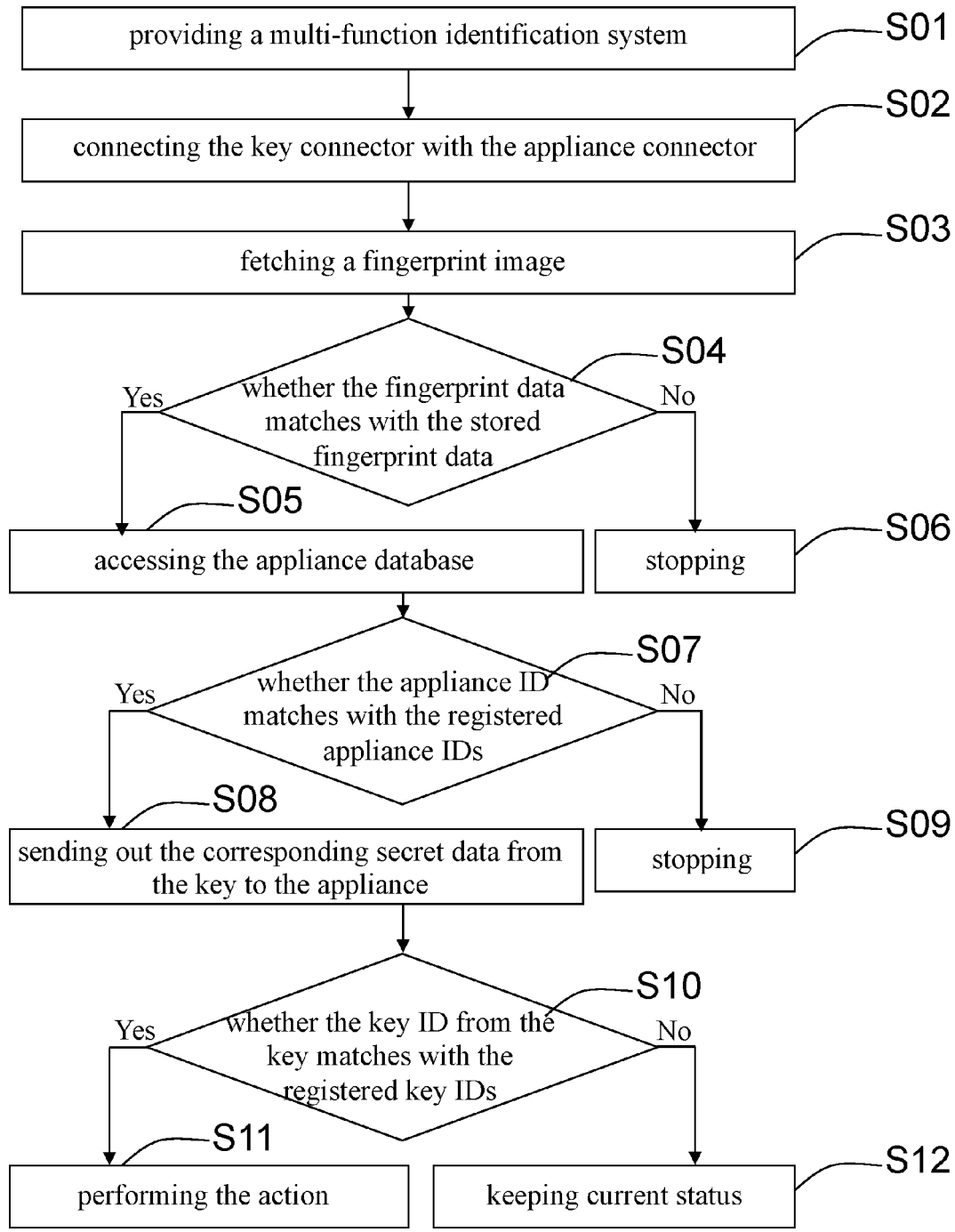
FIG. 2 is a flow chart of the first embodiment according to the present invention.
Figure 3:
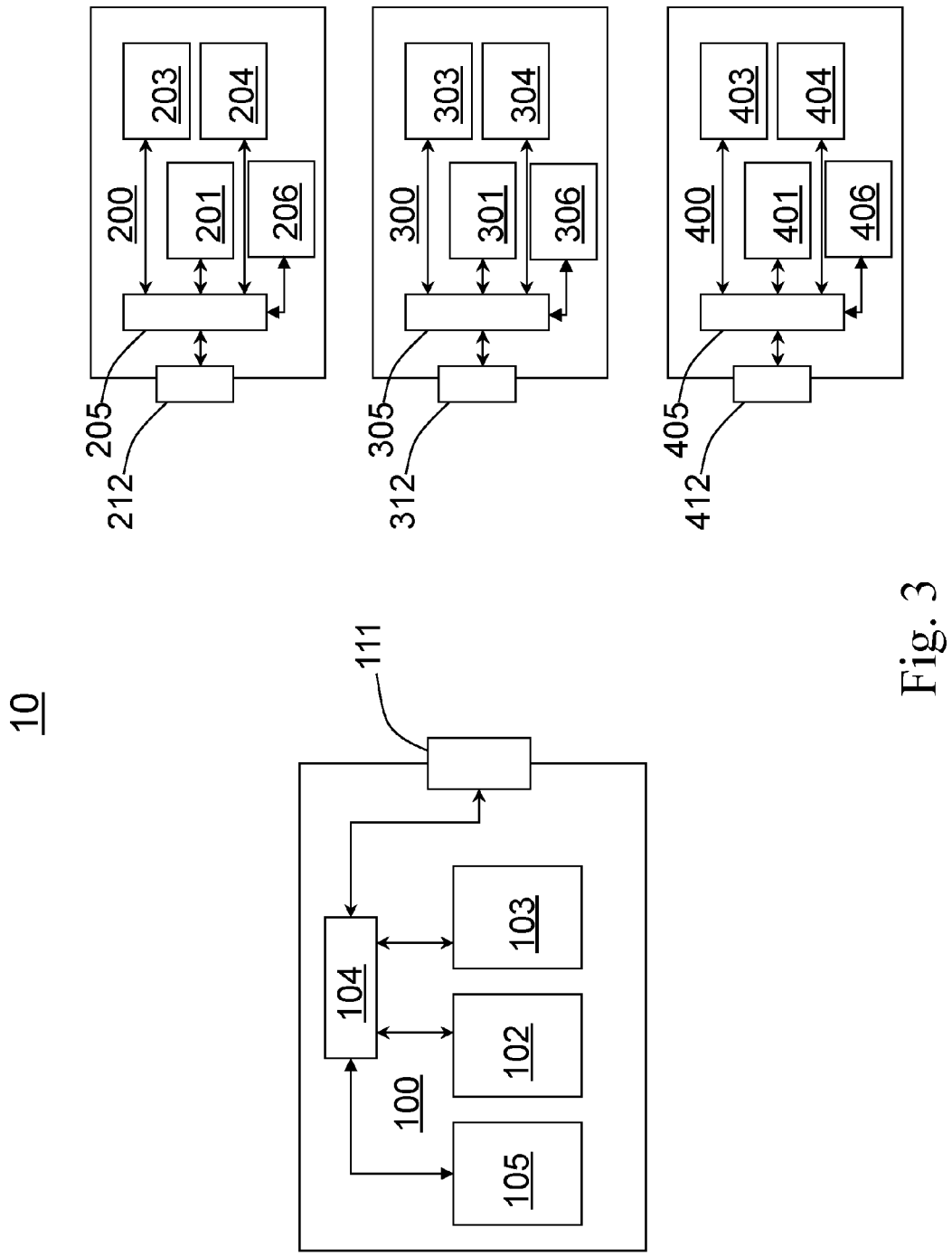
FIG. 3 is another block diagram of the first embodiment according to the present invention.

Please refer to FIG. 1 to FIG. 3. An embodiment of the present invention is disclosed. FIG. 1 is a block diagram of a first embodiment according to the present invention. FIG. 2 is a flow chart of the first embodiment according to the present invention. FIG. 3 is another block diagram of the first embodiment according to the present invention.

A multi-function identification system 10 includes an appliance 100 and a first key 200. A second key 300 and a third key 400 will be used for operation details in later paragraph. The appliance 100 has an appliance connector 101, an appliance memory unit 102, an appliance software memory unit 103, an appliance micro control unit 104, and an appliance power source 105. The first key 200 has a fingerprint sensor 201, a key connector 202, a key memory unit 203, a key software memory unit 204, and a key micro control unit 205.

The appliance connector 101 can transmit data and deliver power. Here, the appliance connector 101 is a Universal Serial Bus (USB) connector. In practice, it can be an external Serial Advanced Technology Attachment (E-SATA) connector as well according the design purpose of the multi-function identification system 10. The appliance memory unit 102 stores a key database which has a numbers of key entries. Each key entry at least includes a registered key identification (ID). Of course, the key entry can contain other information, such as registered date, ranking level of the registered key . . . , etc. The appliance software memory unit 103 is installed appliance software which provides an appliance ID and a secure communication protocol to exchange data with the first key 200 via the appliance micro control unit 104. The appliance software provides functions to match a key ID from the first key 200 with the registered key IDs in the appliance 100. The appliance software also provides functions to manage the key database. Namely, the appliance software can update the key database automatically or according to an order from the appliance micro control unit 104. The appliance software can further uniquely identify the appliance 100 by the appliance ID. It provides the secure communication protocol to the appliance micro control unit 104 for exchanging data with the first key 200.

The appliance micro control unit 104 is electrically linked to the appliance connector 101, the appliance memory unit 102, and the appliance software memory unit 103. The appliance micro control unit 104 can operate the appliance software, communicate with the first key 200 by transmitting data via the appliance connector 101 under the secure communication protocol, send out the appliance ID, and perform an action according to a secret data from the first key 200 when the key ID matches anyone of the registered key IDs.

The appliance power source 105 is electrically linked to the appliance micro control unit 104. It provides power to the appliance connector 101, the appliance memory unit 102, the appliance software memory unit 103, and the appliance micro control unit 104. Here, the appliance power source 105 is a battery. Actually, it can be in any form. For example, the appliance power source 105 can be an AC to DC power adaptor.

The fingerprint sensor 201 fetches a user's fingerprint image and transfers the fingerprint image into a fingerprint data. It is a capacitance type fingerprint sensor since it can be as compact as desired. Other types of fingerprint sensors are workable.

The key connector 202 is electrically connected with the appliance connector 101 of the appliance 200. The key connector 202 and the appliance connector 101 can transmit data when they are connected. The key connector 202 is powered by the appliance connector 101. Therefore, the key connector 202 can pass power to other devices directly or indirectly linked to it. Like the appliance connector 101, the key connector 202 is a USB connector. It can be an E-SATA connector, too. The point is that the key connector 202 and the appliance connector 101 must use the same spec.

The key memory unit 203 stores a fingerprint database and an appliance database. The fingerprint database is used for storing a number of stored fingerprint data. The appliance database has a number of appliance entries. Each appliance entry at least includes a registered appliance ID and the secret data. Of course, the appliance entry can contain other information, such as registered date, message of the registered application . . . , etc. The key software memory unit 204 contains fingerprint processing software. The fingerprint processing software is processed to either enroll a fingerprint data from a fingerprint image or to match the fingerprint data with the stored fingerprint data, It can encrypt the appliance database when at least one stored fingerprint data exists (the appliance database is encrypted as long as it is not null) and decrypt the appliance database to be accessed when the fingerprint data matches anyone of the stored fingerprint data.

The key micro control unit 205 is electrically linked to fingerprint sensor 201, the connector 202, the key memory unit 203 and the key software memory unit 204. It has the key ID which uniquely identifies an owner of the first key 200 and a secure communication protocol used for exchanging data with an appliance. The secure communication protocol used here should be the same as that one used in the appliance 100. The key micro control unit 205 is used for processing the fingerprint processing software, communicating with the appliance 100 by transmitting data via the key connector 202 under the secure communication protocol, sending out the key ID, receiving the appliance ID, matching the appliance ID with the registered appliance IDs, and when one matched registered appliance ID is found, sending out the secret data stored with the matched registered appliance ID in the same appliance entry.

Below, the method for operating the multi-function identification system 10 is described. Please refer to FIG. 2. The method starts at providing the multi-function identification system 10 (S01). Then, connect the key connector 202 with the appliance connector 101 (S02). The fingerprint sensor 201 fetches a fingerprint image (S03). The fingerprint processing software starts to match a fingerprint data transformed from the fingerprint image with the stored fingerprint data via the key micro control unit 205 (S04). If the fingerprint data matches with one of the stored fingerprint data, the appliance database is allowed to be accessed (S05). Otherwise, the operation of the method stops here (S06). The fingerprint sensor 201 can be back to the status for fetching another fingerprint. After that, the key micro control unit 205 starts to match the appliance ID from the appliance 100 with the registered appliance IDs (S07) in the key memory unit 203. If the appliance ID matches one of the registered appliance IDs, the key micro control unit 205 sends out the corresponding secret data stored with the matched registered appliance ID in the same appliance entry (S08). Otherwise, the operation of the method stops here (S09). Then, the appliance software matches the key ID from the key 200 with the registered key IDs via the appliance micro control unit 104 (S10). Finally, the appliance micro control unit 104 performs the action based on the received secret data if the key ID matches one registered key ID (S11). Otherwise, the appliance micro control unit 104 keeps current status of the appliance 100 (S12), doing nothing for a request from a non-registered key.

Before the multi-function identification system 10 works, a registration process for the appliance 100 and the first key 200 is needed. Preferably, the appliance 100 and the first key 200 should both have a registration mode and are set in the registration mode for registration. During the registration process, the appliance 100 stores the key ID in the key database and the key 200 stores the appliance ID and a corresponding secret data in the appliance database. Thus, both items memorize the ID of the other one after the registration process completes.

It should be noticed that the registered appliance ID and the secret data can be further encrypted or decrypted by the fingerprint processing software for the corresponding fingerprint data. Namely, the registered appliance ID and the secret data are encrypted or decrypted by the fingerprint processing software according to a specified feature of the corresponding fingerprint data. The registered appliance ID and the secret data may be encrypted when registered according to the fingerprint data. Once the fingerprint data is found again by the fingerprint sensor 201, the registered appliance ID and the secret data are decrypted.

In the present embodiment, the appliance connector 101 is a female type connector and the key connector 202 is a male type connector. This implies that the appliance 100 is a host and the key 200 is a slave (or simply said, device) when they are connected. However, according to the spirit of the present invention, the key 200 can also act as a USB host when it is not connected with the appliance 100. Preferably, the key 200 is a USB OTG (on-the-go) device.

In this embodiment, the appliance 100 is a door lock. Accordingly, the key 200 is used to unlock (the action) the door lock with a fingerprint sensor. For other applications, the appliance 100 can be a car ignition system, a motorcycle ignition system, a personal computer, or a smart card reader. The key 200 becomes a car key, a motorcycle key, a memory stick or a smart card, respectively. The action is to ignite the car ignition system, ignite the motorcycle ignition system, access the personal computer and enable the smart card reader.

According to the spirit of the present invention, the multi-function identification system 10 can further include a second key 300. The second key 300 has a fingerprint sensor 301, a key connector 302, a key memory unit 303, a key software memory unit 304, and a key micro control unit 305. Functions of the fingerprint sensor 301, the key connector 302, the key memory unit 303, the key software memory unit 304, and the key micro control unit 305 are the same as that of the fingerprint sensor 201, the key connector 202, the key memory unit 203, the key software memory unit 204, and the key micro control unit 205, respectively. The only difference is that their key IDs are different. The appliance 100 can differentiate the first key 200 from the second key 300 and perform different actions individually. For example, two users use their credit cards but the credit for each one is different.

Likewise, the multi-function identification system 10 can further include a third key 400. The third key 400 has a fingerprint sensor 401, a key connector 402, a key memory unit 403, a key software memory unit 404, and a key micro control unit 405. Functions of the fingerprint sensor 401, the key connector 402, the key memory unit 403, the key software memory unit 404, and the key micro control unit 405 are the same as that of the fingerprint sensor 201, the key connector 202, the key memory unit 203, the key software memory unit 204, and the key micro control unit 205, respectively. However, although the third key 400 has its unique key ID, the third key 400 is not registered with the appliance 100. The present invention permits many users to have their own key. As long as the registration process is not completed, the key can not commend the appliance.

According to the present invention, each key can entry further include another registered key ID or a registered message. Also, the appliance entry can further include another registered appliance ID or a registered message. The purpose of another key ID or registered message is for an alternative in case the original key ID is lost for some reason in the appliance 100. The registered message can be a PIN (personal identification number). Same, the purpose of another appliance ID or registered message is for an alternative in case the original appliance ID is lost.

Of course, the linkage between the appliance 100 and the key 200, 300 and 400 is not limited to wired means according to the present invention. Wireless devices can be introduced. Please see FIG. 3. FIG. 3 replaces some elements in FIG. 1 and adds some other necessary element to fulfill the requirement. First, the appliance connector 101 needs to be changed to a wireless appliance transceiver 111 for transmitting data. Preferably, it is a RFID reader. Then, the key connectors 202, 302 and 402 are replaced by key transceivers 212, 312 and 412. The key transceivers 212, 312 and 412 transmit data with the appliance transceiver 111 of the appliance 100. Accordingly, they are RFID tags to be initiated by a signal from the appliance transceiver 111.

However, power from the signal mentioned above is not strong enough to drive other elements in the key 200, 300 and 400. Therefore, a key power source is needed to keep those elements working and separated from the power transferred with the signal. A key power 206 is electrically linked to the key micro control unit 205, for providing power to the fingerprint sensor 201, the key memory unit 203, the key software memory unit 204 and the key micro control unit 205. Similarly, a key power 306 is electrically linked to the key micro control unit 305, for providing power to the fingerprint sensor 301, the key memory unit 303, the key software memory unit 304 and the key micro control unit 305. A key power 406 is electrically linked to the key micro control unit 405, for providing power to the fingerprint sensor 401, the key memory unit 403, the key software memory unit 404 and the key micro control unit 405. The key powers 206, 306 and 406 can be mercury batteries for the compact size. Since the key is empowered by the key power, a key with a key transceiver can work as well as the one with key connector (for transferring power). Operation processes are the same as above except connecting the key connector 202 with the appliance connector 101 is changed to linking the key transceiver 212 with the appliance transceiver 111.

Figure 4:
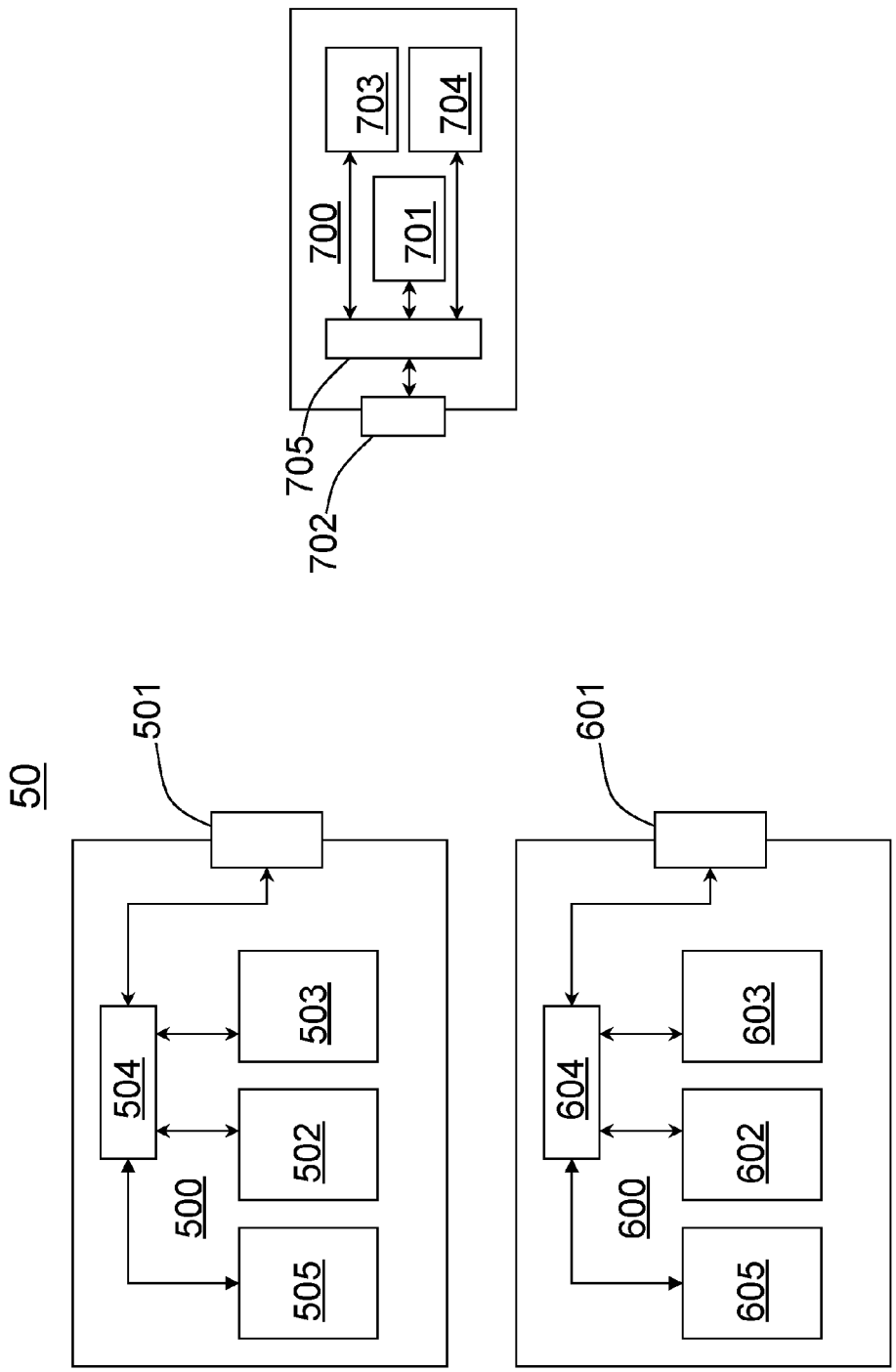
FIG. 4 is a block diagram of a second embodiment according to the present invention.

Please refer to FIG. 4. A second embodiment is described. A multi-function identification system 20 includes a first appliance 500, a second appliance 600 and a key 700. The first appliance 500 has an appliance connector 501, an appliance memory unit 502, an appliance software memory unit 503, an appliance micro control unit 504, and a power source 505. The second appliance 600 has an appliance connector 601, an appliance memory unit 602, an appliance software memory unit 603, an appliance micro control unit 604, and a power source 605. The key 700 has a fingerprint sensor 701, a key connector 702, a key memory unit 703, a key software memory unit 704, and a key micro control unit 705. The first appliance 500 and the second appliance 600 have the same functions as the appliance 100 in the other embodiment. Therefore, the corresponding elements have the same function. It is not repeated. The difference between the first appliance 500 and the second appliance 600 is that the appliance software generates different appliance ID for each. That enables the first appliance 500 and the second appliance 600 to be differentiated by the key 700.

For the key 700, functions of the fingerprint sensor 701, the key connector 702, the key memory unit 703, the key software memory unit 704, and the key micro control unit 705 are identical as that of the fingerprint sensor 201, a key connector 202, a key memory unit 203, a key software memory unit 204, and a key micro control unit 205. Thus, the key 700 can send the secret data to the first appliance 500 and the second appliance 600 for getting the action as long as registration processes are completed with each appliance. The two appliances can be controlled by the key 700. For instance, a registered key can open two locked door locks.

Based on the description above, under a registration process, the multi-function identification system according to the present invention has below advantages that multiple appliances can be controlled by a single key, an appliance can be controlled by different keys, and users can set specified actions to be conducted after identification processes are completed. Meanwhile, the key is a plug-and play and on-the-go product. It is desired that the key is a host used for other purpose.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A multi-function identification system, comprising:
   an appliance, used in association with at least one key, each of the at least one key has a corresponding key entry which comprises at least one registered user identification (ID) for uniquely identifying an owner, wherein each of the at least one registered user ID represents a different owner, comprising:
     an appliance memory unit for storing each of the key entry of the at least one key in a key database;
     an appliance software memory unit for installing appliance software which has an appliance ID and a secure communication protocol, wherein the appliance software identifies whether a user ID received from a key matches with anyone of the registered user IDs in the key entries of the key database, manages the key database, uniquely identifies the appliance by the appliance ID, and provides the secure communication protocol for exchanging data with the at least one key; and
     an appliance micro control unit electrically linked to the appliance memory unit and the appliance software memory unit, for operating the appliance software, communicating with the at least one key by transmitting the data using the secure communication protocol, sending out the appliance ID to the at least one key, and performing an action using a secret data received from the at least one key in response to determining the received user ID matches anyone of the registered user IDs; and
   the at least one key, each of the at least one key comprising:
     a fingerprint sensor for fetching a user's fingerprint image and transforming the fingerprint image into a fingerprint data;
     a key memory unit for storing a fingerprint database and an appliance database, wherein the fingerprint database is used for storing a plurality of stored fingerprint data, and the appliance database has a plurality of appliance entries, each of the appliance entries at least comprises a registered appliance ID and the secret data, each of the registered appliance IDs corresponds to a different appliance;
     a key software memory unit installed with fingerprint processing software for matching the fingerprint data with the plurality of stored fingerprint data so that fingerprint data matching is performed by the at least one key itself without requiring identification of any remote third party, wherein the appliance database is encrypted when at least one stored fingerprint data exists and the appliance database is allowed to be accessed only in response to determining the fingerprint data matches anyone of the plurality of stored fingerprint data; and
     a key micro control unit electrically linked to the fingerprint sensor, the key memory unit and the key software memory unit, having the user ID which uniquely identifies an owner of the at least one key and the secure communication protocol used for exchanging the data with the appliance, for processing the fingerprint processing software, communicating with the appliance by transmitting the data using the secure communication protocol, sending out the user ID to the appliance, receiving the appliance ID from the appliance, matching the received appliance ID with the registered appliance IDs, and sending out the secret data stored with the matched registered appliance ID in the same appliance entry to the appliance in response to determining one matched registered appliance ID is found for the received appliance ID.

2. The multi-function identification system according to claim 1, wherein the appliance further comprises an appliance connector, electrically linked to the appliance micro control unit, for transmitting data and delivering power.

3. The multi-function identification system according to claim 2, wherein the appliance connector is a Universal Serial Bus (USB) connector or an external Serial Advanced Technology Attachment (E-SATA) connector.

4. The multi-function identification system according to claim 2, wherein the appliance connector is a female type connector.

5. The multi-function identification system according to claim 2, wherein the at least one key further comprises a key connector, electrically linked to the key micro control unit, for electrically connecting with the appliance connector of the appliance, and transmitting data with the appliance connector when connected.

6. The multi-function identification system according to claim 5, wherein the key connector is a USB connector or an E-SATA connector.

7. The multi-function identification system according to claim 5, wherein the key connector is a male type connector.

8. The multi-function identification system according to claim 1, wherein the appliance further comprises an appliance power source electrically linked to the appliance micro control unit, for providing power to the appliance memory unit, the appliance software memory unit, and the appliance micro control unit.

9. The multi-function identification system according to claim 1, wherein the appliance stores the user ID in the key database and the at least one key stores the appliance ID, and a corresponding secret data in the appliance database for the appliance and the at least one key to be registered.

10. The multi-function identification system according to claim 1, wherein the registered appliance ID and the secret data in each of the appliance entries are further encrypted or decrypted by the fingerprint processing software using the corresponding fingerprint data.

11. The multi-function identification system according to claim 1, wherein the appliance is a door lock, a car ignition system, a motorcycle ignition system, a personal computer, or a smart card reader.

12. The multi-function identification system according to claim 1, wherein the action is unlocking a door lock, igniting a car ignition system, igniting a motorcycle ignition system, accessing a personal computer and enabling a smart card reader.

13. The multi-function identification system according to claim 1, wherein the appliance further comprises an appliance transceiver, electrically linked to the appliance micro control unit, for transmitting data.

14. The multi-function identification system according to claim 13, wherein the appliance transceiver is a Radio Frequency Identification (RFID) reader.

15. The multi-function identification system according to claim 13, wherein the at least one key further comprises a key transceiver, electrically linked to the key micro control unit, for transmitting data with the appliance transceiver of the appliance; and a key power source, electrically linked to the key micro control unit, for providing power to the fingerprint sensor, the key memory unit, the key software memory unit and the key micro control unit.

16. The multi-function identification system according to claim 15, wherein the key transceiver is a RFID tag.

* * * * *